UNITED STATES PATENT OFFICE.

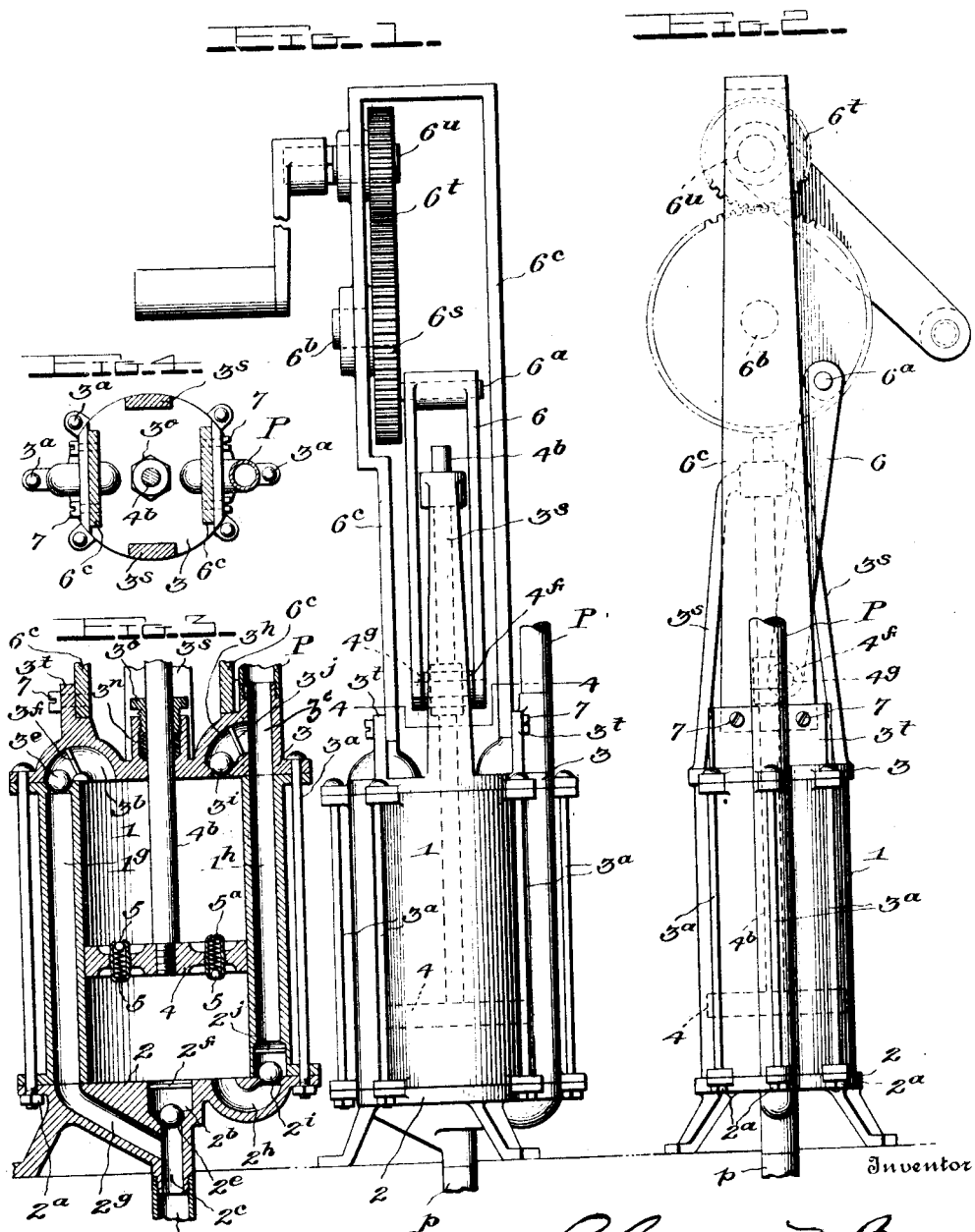

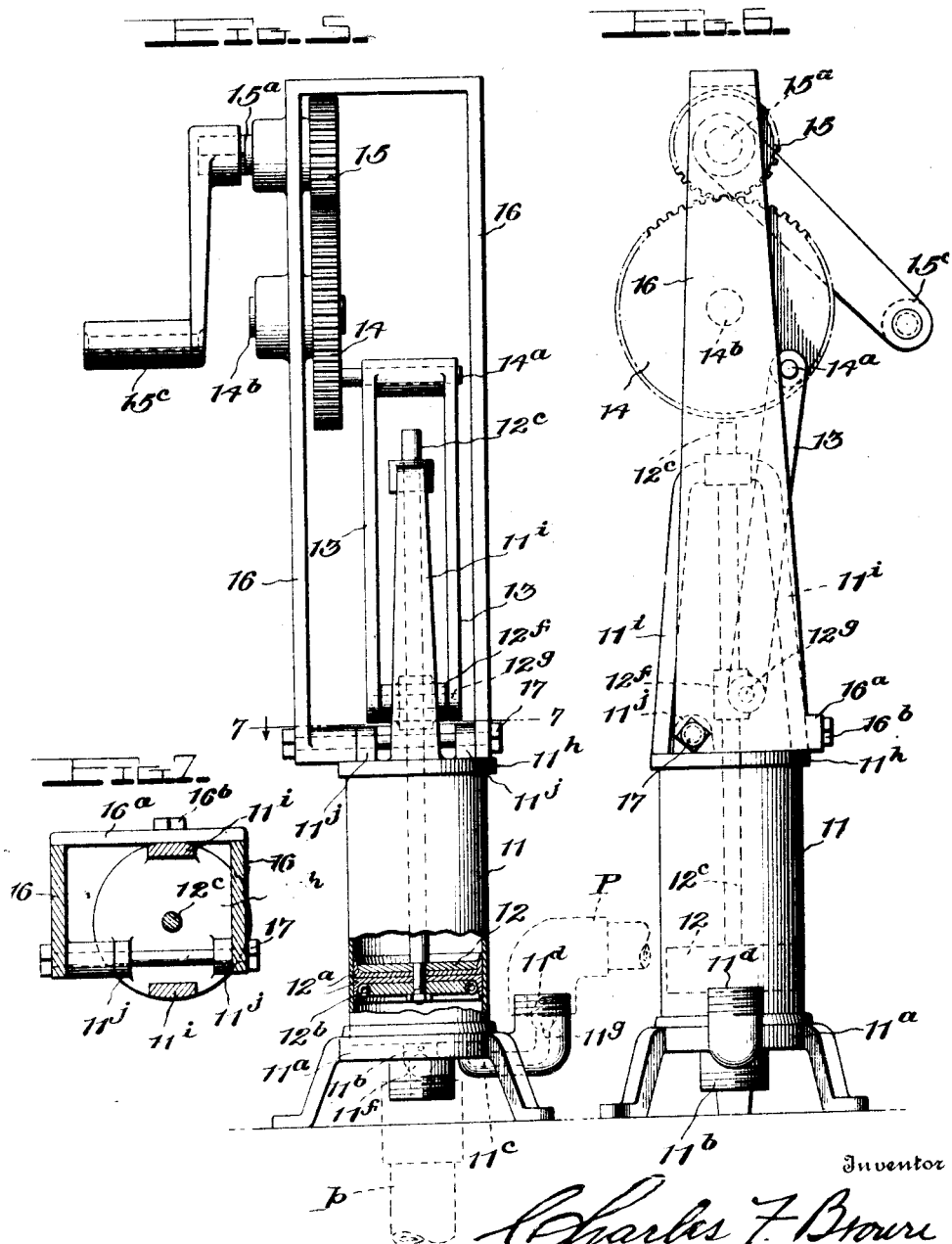

CHARLES F. BROWN, OF NEW YORK, N. Y., ASSIGNOR TO UNIVERSAL LIQUID REGISTER COMPANY, OF NEW YORK, N. Y., A CORPORATION OF NEW YORK.

PUMP.

1,170,873.    Specification of Letters Patent.    Patented Feb. 8, 1916.

Application filed December 30, 1913. Serial No. 809,549.

*To all whom it may concern:*

Be it known that I, CHARLES F. BROWN, a citizen of the United States, residing at New York, in the county of New York and State of New York, have invented certain new and useful Improvements in Pumps; and I hereby declare that the following is a full, clear, and exact description thereof, reference being had to the accompanying drawings, which form part of this specification.

This invention is a novel improvement in pumps particularly designed for use in pumping charged liquids; and its principal object is to provide a pump which will be effective in operation and will not permit the escape of gases from the liquids being handled.

A further object is to so construct the pump that it will not become "air-bound" and will not be injured by the sudden closing of the supply or discharge pipes or valves.

A further object is to so provide a pump that can be easily operated manually—and the parts of which can be easily assembled.

The invention resides in the novel construction and arrangement of parts hereinafter claimed, and in the accompanying drawings I have illustrated embodiments thereof which I will explain in detail.

In said drawings—Figure 1 is a front elevation of the pump. Fig. 2 is a side view of Fig. 1. Fig. 3 is a vertical section through the pump cylinder, showing the ports, passages and valves. Fig. 4 is a transverse sectional view on line 4—4, Fig. 1 looking down. Fig. 5 is a front elevation of a single acting pump. Fig. 6 is a side view of Fig. 5, and Fig. 7 is a transverse section on line 7—7, Fig. 5 looking down.

As shown in Figs. 1 to 4, the pump proper may be formed of a central cylindric portion 1, a lower head or base 2 and an upper head 3. The cylinder and heads may be securely united in any desired way—being shown as flanged and perforated for the passage of tie bolts $3^a$ secured by nuts $2^a$. The head 2 is provided with a central inlet port $2^b$ which communicates with the main supply passage $2^c$. The port $2^b$ is provided with a check valve $2^e$, of any suitable construction, by which the return of fluid through said port is prevented. This valve $2^e$ is shown as a ball valve and may be retained in the port $2^b$ by a bar or retainer $2^f$ of any suitable kind. The supply passage $2^c$ communicates below the valve $2^e$ with a branch passage $2^g$, which communicates with a vertical passage $1^g$ in the side wall of the cylinder 1, which passage extends to the top of the cylinder and communicates with a port $3^b$ in the head 3, which port opens into the upper end of the cylinder. The port $3^b$ may also be provided with a check valve of any suitable kind, which may be a ball valve $3^c$, retained by a cage or bar $3^f$, and which will prevent return of liquid from the cylinder through the port $3^b$. The head 2 is also provided with an outlet port $2^h$ which communicates with a vertical passage $1^h$ in the side wall of the cylinder 1, and said passage $1^h$ extends up to and communicates with a passage $3^c$ in the head 3, which passage may be connected with an outlet pipe P through which the liquid can be directed from the pump to any suitable point of discharge. The head 3 is provided with an outlet port $3^h$ which communicates with the passage $3^c$. Return of liquid through the port $2^h$ may be prevented by means of a valve $2^i$ of any suitable construction, shown as a ball valve in the lower end of the passage $1^h$ and retained by a bar or cage $2^j$. The return of liquid through the port $3^h$ can be prevented by a valve $3^i$ and retained by a cage or bar $3^j$.

A piston 4 is fitted to reciprocate within the cylinder 1 and may be of any suitable construction. The piston and the other portions of the pump are preferably made of bronze or non-corrosive metal. The head 3 is also provided with an axial opening for the passage of the piston rod $4^b$, and surrounding this opening, on the outer side of the head, is a stuffing box $3^n$ which may be provided with a gland $3^o$ of the usual type. As shown in Fig. 3 the piston 4 is provided with apertures in which are fitted relief valves 5 that are normally held closed by springs $5^a$; said relief valves are arranged to open in opposite directions, that is, one valve will open under pressure from the upper side of the piston and the other will open under pressure from the lower side of the piston. The springs $5^a$ are made of sufficient strength to hold these valves normally closed under the pressure required to expel the liquid from the cylinder; and approximately springs $5^a$ hold the valves 5 closed with about 25% more pressure than is exerted by the piston on the liquid in the cylinder either in drawing liquid into the cylinder or ejecting it therefrom. The object of these relief valves is to prevent the pump becoming "air-bound".

Pumps used for pumping charged liquids; and especially double-acting pumps, are particularly liable to become "air-bound" by the collection of air or gas trapped in the cylinder, but in my pump if air should be trapped and excessive pressure be brought to bear on either side of the piston the proper release valve will open under such excessive pressure and act as a vent valve to relieve the pressure. Such relief valves are particularly useful when the pump is used for pumping charged liquids and operated automatically; as they will prevent danger of excessive shock in case of a sudden closing of the stop cock in either the discharge pipe or the supply pipe, as in such case the proper relief valve would open and allow liquid to flow from one side of the piston to the other.

As the piston rises liquid is drawn into the passage $2^c$ through a pipe P connected with the supply, and enters the cylinder below the piston through the port $2^b$; at the same time the liquid above the piston is expelled through the port $3^h$ into the passage $3^c$: the ports $2^h$ and $3^b$ being meanwhile closed by the valves $2^i$ and $3^e$ respectively. As the piston descends liquid will be drawn into the cylinder above the piston through the passages $2^c$, $2^g$, $1^g$ and port $3^b$; and liquid will be expelled from the cylinder below the piston through the port $2^h$ and passages $1^h$ and $3^c$; while the ports $2^b$ and $3^h$ will be closed by the valves $2^e$ and $3^i$ respectively.

If for any reason excessive pressure should be exerted on either side of the piston, due to the closing of the supply or discharge pipes $p$—P with which the cylinder is connected, the proper relief valve 5 will open and relieve such excess pressure as above explained.

In order to operate the piston manually I provide the following devices—The head 3 is preferably provided with an arch or bracket $3^e$, in the upper end of which is provided an opening for guiding the upper end of the piston rod $4^b$. To the piston rod $4^b$ above the cylinder is attached a casting $4^f$ transfixed by a pin $4^g$ to the ends of which are pivotally connected the lower ends of a yoke 6, the upper end of which yoke is pivotally connected to a crank pin $6^a$ attached to a crank-gear $6^s$ that is rotatably mounted on a stud $6^b$ attached to a frame $6^c$ detachably secured to the head 3. Gear $6^s$ meshes with a pinion $6^t$ on a stub shaft $6^u$ journaled in a bearing in the frame $6^c$ above the gear $6^s$. Said shaft $6^u$ can be turned by any suitable means, a crank handle being indicated in the drawings. The frame $6^c$ is substantially rectangular in form and is sufficient width to embrace the yoke 6, the gears and the bracket $3^s$. The lower ends of the side members of frame $6^c$ stand upon the head 3 of the cylinder, and beside perforated lugs $3^t$, thereon; and may be fastened to said lugs by means of screws 7 that transfix the lugs and engage the lower ends of the frame. I thus securely connect the piston operating devices to the pump cylinder, and at the same time enable such operating devices to be easily detached from the cylinder for the purpose of transportation if desired; or when it is necessary to inspect the interior of the cylinder.

In operation the shaft $6^u$ is turned by hand, or by any other suitable means, and pinion $6^t$ imparts motion to the crank gear $6^s$, and as said gear is rotated the yoke 6 is reciprocated and imparts a like movement to the piston 4 in the cylinder.

In Figs. 5 to 7 I have illustrated a modification of the invention as applied to a single acting pump. In this construction an ordinary cylinder 1 is closed at top by a head $11^h$ and at bottom by a head $11^a$ which has an inlet $11^b$ that can be closed by a valve $11^c$; and an outlet $11^d$ which may be closed against return of liquid by valve $11^e$; the piston 12 is connected to a rod $12^c$ which extends through the head $11^h$; this piston may be provided with a cup leather $12^a$ that is distended by an annular helical spring $12^b$, by which the leather will always be held in close contact with the inner wall of the cylinder. In this construction the piston rod $12^c$ extends through the upper head $11^h$ of the cylinder, which head is provided with an arch or bracket $11^i$, the upper end of which guides the upper end of the piston rod. To the piston rod $12^c$ is attached a casting $12^f$ that is transfixed by a pin, $12^g$, to the ends of which pin are pivotally connected the lower ends of a yoke 13, the upper end of which is connected to a crank pin $14^a$ attached to a crank-gear 14 that is rotatably mounted on a stud $14^b$ attached to a frame 16 secured to the cylinder. Gear 14 meshes with a pinion 15 on a shaft $15^a$ journaled in a bearing in the frame 16 above the gear 14. Said shaft $15^a$ can be turned by any suitable means, preferably a crank handle $15^c$ being used, as indicated in the drawings. The frame 16 is substantially rectangular in form and is of sufficient width to embrace the yoke 13, the gears and the bracket $11^i$. The side members of this frame 16 stand upon the head $11^h$ of the cylinder and outside perforated lugs $11^j$ on said head. These lugs and the lower ends of the side members of the frame 16 are perforated for the passage of a tie-bolt 17 that securely fastens the frame 16 to the top plate $11^h$ of the cylinder. The lower ends of the side members of the frame 16 are also connected by a bar 16ª which fits against the outer side of one of the lugs of the bracket 11ⁱ and is fastened thereto by a bolt 16ᵇ. I thus have a three-point attachment of the frame 16 to the top which affords a secure and firm connection of the operating devices to the pump cylinder, and at the same time enables such operating devices to be easily detached from the cylinder for the purpose of transportation if desired; or when it is necessary to inspect the interior of the cylinder.

In operation the shaft 15 is turned by hand, or any other suitable means, and pinion 15 imparts motion to the crank gear 14; and as gear 14 is rotated the yoke 13 is reciprocated and imparts a like movement to the piston 12 in the cylinder; as the piston rises in the cylinder fluid is drawn in from the source of supply through the inlet 11ª and as the piston descends fluid is discharged from the cylinder through the outlet 11ᵈ.

The pump shown in Figs. 5-7 is single acting and can be effectively used for pumping charged or aerated liquids.

What I claim is:

1. In a pump the combination with a cylinder, a bracket attached to one head thereof and adapted to guide the piston rod, a piston in said cylinder, a piston rod extending through said head and guide-bracket, a frame attached to the piston head beside said bracket and extending above the same, a crank gear, a yoke connected with the piston rod and crank gear, and means for operating said crank gear.

2. In a pump the combination of a cylinder provided with inlet and outlet ports, a piston in the cylinder, a piston rod attached to said piston and extending through one of the heads, a piston rod guide bracket attached to said head, a frame detachably attached to said head beside said guide bracket, a crank gear journaled in said frame, a yoke pivotally connected to said rod and crank gear, and means for rotating said gear.

3. In a pump, the combination of a cylinder provided with heads, and valved inlet and outlet ports; a piston in the cylinder, a piston rod attached to said piston and extending through one of the heads; a piston rod guide bracket attached to said head, a frame detachably attached to said head at right angles to said guide bracket, a crank gear journaled in said frame, a yoke pivotally connected to said rod and said crank gear, a pinion journaled in the frame and meshing with said gear, and a crank for rotating said pinion.

In testimony that I claim the foregoing as my own I affix my signature in presence of two witnesses.

CHARLES F. BROWN.

Witnesses:
 A. D. DICKERSON,
 J. E. NEIKIRK.